No. 12,504. REISSUED JULY 17, 1906.

F. C. HOFFMAN.

RAIL BOND FOR STEAM AND ELECTRIC RAILWAYS.

APPLICATION FILED JUNE 9, 1906.

Witnesses:

Bernard Cowen

Henry Barnes

Inventor:

Frank C. Hoffman by Henry D. Williams

Attorney

UNITED STATES PATENT OFFICE.

FRANK CARPENTER HOFFMAN, OF SOMERVILLE, NEW JERSEY.

RAIL-BOND FOR STEAM AND ELECTRIC RAILWAYS.

No. 12,504. Specification of Reissued Letters Patent. Reissued July 17, 1906.

Original No. 812,040, dated February 6, 1906. Application for reissue filed June 9, 1906. Serial No. 321,072.

*To all whom it may concern:*

Be it known that I, FRANK CARPENTER HOFFMAN, a citizen of the United States, residing at Somerville, in the county of Somerset and State of New Jersey, have invented new and useful Improvements in Rail-Bonds for Steam and Electric Railways, of which the following is a specification.

This invention relates to rail-bonds for steam and electric railways.

The objects of the invention are to improve and simplify the construction of such devices; furthermore, to increase their efficiency in operation.

With the foregoing and other objects in view, which will appear as the description proceeds, the invention resides in the combination and arrangement of parts and in the details of construction hereinafter described and claimed as a practical embodiment thereof.

Figure 1:
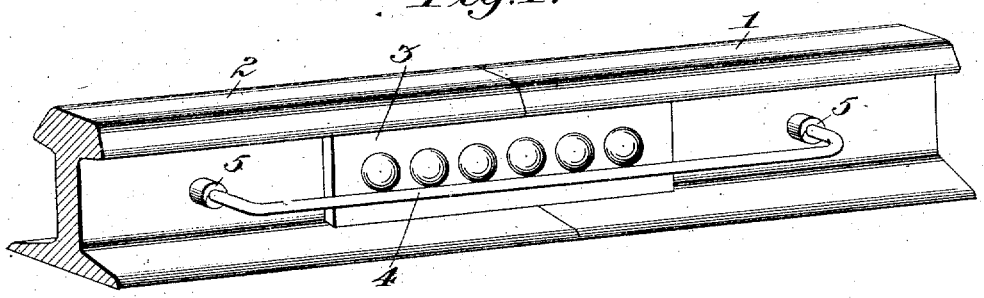
Figure 2:
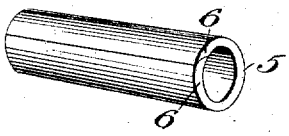
Figure 3:
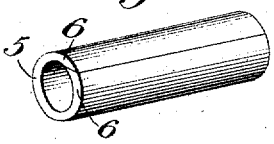
Figure 4:
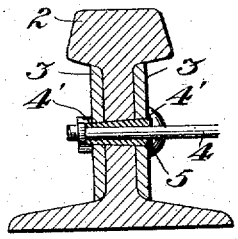

In the accompanying drawings, forming part of this specification, Figure 1 is a perspective view of a rail-bond constructed in accordance with the present invention. Fig. 2 is a perspective view of a split sleeve having curved overlapping edges. Fig. 3 is a similar view of a split sleeve having straight overlapping edges. Fig. 4 is a transverse section through the rail-joint.

Like reference-numerals indicate corresponding parts in the different views.

The reference-numerals 1 and 2 indicate rail ends, which are connected by means of the fish-plates 3 in the usual manner. The bond-wire 4 has its ends fitted into openings 4′ of the web portions of the two rails, as shown, and a split sleeve, such as 5, having overlapping edges 6 and preferably being tapered in form, is fitted around the bond-wire and is driven into the rail-webs to fit tightly in the openings therein. As each of the split sleeves 5 is driven into the rail it rolls tightly around the bond-wire, this rolling action being facilitated by the inclined edges of the sleeves, which slide freely upon each other. In this manner a firm, uniform, and waterproof joint between the bond-wire and the rail is produced.

In manufacturing the improved split sleeves the overlapping edges 6 thereof may be either curved, as shown in Fig. 2, or straight, as shown in Fig. 3.

I am aware that split sleeves or bushings have been employed heretofore in connection with rail-bonds, and I do not claim the use of a split sleeve broadly. I am not aware, however, that a split sleeve having overlapping edges for the purpose specified has been employed, and my invention resides in this particular construction.

Having thus described the invention, what is claimed is—

A rail-bond comprising rail-sections provided with openings therein in proximity to their meeting ends, split sleeves having overlapping edges and located in said openings, the split sleeves and openings in the rail-sections having tapered engagements and a bond-wire with its ends passing through said sleeves, said sleeves serving to be forced or driven into said openings to tightly embrace the inclosed ends of the wire which action also permits said sleeves to be tightly fitted into the openings in the rails, substantially as specified.

In testimony whereof I have affixed my signature in presence of two witnesses.

FRANK CARPENTER HOFFMAN.

Witnesses:

A. H. LEIVERS,
W. D. BRADY.